United States Patent
Graham et al.

(10) Patent No.: US 9,395,023 B2
(45) Date of Patent: Jul. 19, 2016

(54) FLEXIBLE PIPE AND END FITTING WITH INTEGRATED SENSOR

(75) Inventors: Geoffrey Stephen Graham, Newcastle-upon-Tyne (GB); Neville Dodds, Newcastle-upon-Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 328 days.

(21) Appl. No.: 13/878,548

(22) PCT Filed: Sep. 28, 2011

(86) PCT No.: PCT/GB2011/051834
§ 371 (c)(1),
(2), (4) Date: Apr. 9, 2013

(87) PCT Pub. No.: WO2012/059729
PCT Pub. Date: May 10, 2012

(65) Prior Publication Data
US 2013/0192707 A1    Aug. 1, 2013

(30) Foreign Application Priority Data
Nov. 3, 2010    (GB) .................................. 1018538.7

(51) Int. Cl.
*F16L 55/00*    (2006.01)
*F16L 11/02*    (2006.01)
(Continued)

(52) U.S. Cl.
CPC .............. *F16L 11/02* (2013.01); *E21B 47/0006* (2013.01); *E21B 47/01* (2013.01); *F16L 11/083* (2013.01); *F16L 11/12* (2013.01); *F16L 33/01* (2013.01);
(Continued)

(58) Field of Classification Search
CPC . F16L 2201/30; F16L 2201/60; F16L 11/124; G01M 3/165; G01M 3/04
USPC ......................................... 138/104, 109, 129
See application file for complete search history.

(56) References Cited

U.S. PATENT DOCUMENTS

| | | | | |
|---|---|---|---|---|
| 1,585,688 A | * | 5/1926 | Perry ........................ | H02G 3/02 16/108 |
| 2,516,864 A | * | 8/1950 | Gilmore .................. | B29B 13/00 138/133 |

(Continued)

FOREIGN PATENT DOCUMENTS

| | | |
|---|---|---|
| EP | 2 063 068 | 5/2009 |
| FR | 2 714 708 | 7/1995 |

(Continued)

OTHER PUBLICATIONS

Unofficial English translation of Chinese Office Action and Search Report issued in connection with corresponding CN Application No. 201180053205.0 on Aug. 29, 2014.

(Continued)

*Primary Examiner* — Patrick F Brinson
(74) *Attorney, Agent, or Firm* — Klarquist Sparkman, LLP

(57) ABSTRACT

Apparatus and method of manufacturing a flexible pipe body are disclosed. The method may include providing a fluid retaining layer; wrapping a plurality of tensile armour elements around the fluid retaining layer; and wrapping a crush resistant elongate body that houses at least one fibre element around the fluid retaining layer and radially between two of the plurality of tensile armour elements. Matrix material provided in the elongate body may be cured subsequent to fitting the pipe body to an end fitting.

25 Claims, 5 Drawing Sheets

(51) Int. Cl.
    E21B 47/00     (2012.01)
    E21B 47/01     (2012.01)
    F16L 11/08     (2006.01)
    F16L 11/12     (2006.01)
    F16L 33/01     (2006.01)
    G01L 1/24      (2006.01)
(52) U.S. Cl.
    CPC ........... *G01L 1/246* (2013.01); *Y10T 29/49764* (2015.01)

(56) References Cited

U.S. PATENT DOCUMENTS

| | | | | |
|---|---|---|---|---|
| 4,446,892 | A * | 5/1984 | Maxwell | F16L 11/12 116/227 |
| 4,517,404 | A * | 5/1985 | Hughes | A47L 9/24 138/109 |
| 5,969,618 | A * | 10/1999 | Redmond | G01M 3/18 174/11 R |
| 6,353,178 | B1 * | 3/2002 | Linhart | A47L 9/246 138/138 |
| 6,404,961 | B1 | 6/2002 | Bonja et al. | |
| 6,722,904 | B2 * | 4/2004 | Linhart | A47L 9/246 174/135 |
| 7,024,941 | B2 | 4/2006 | Andersen | |
| 8,291,939 | B2 * | 10/2012 | Ferrone | A01K 7/027 138/104 |
| 8,479,565 | B2 | 7/2013 | Izumo et al. | |
| 8,528,385 | B2 * | 9/2013 | Raghavendra | G01M 3/047 73/40.5 R |
| 2004/0168521 | A1 | 9/2004 | Andersen | |
| 2004/0213529 | A1 | 10/2004 | Dowd et al. | |
| 2004/0250815 | A1 * | 12/2004 | Scott | A61M 16/08 128/204.17 |
| 2010/0084035 | A1 | 4/2010 | Binet et al. | |

FOREIGN PATENT DOCUMENTS

| | | |
|---|---|---|
| JP | 2009243529 A | 10/2009 |
| JP | 2009243529 A | 10/2009 |
| WO | WO 9932862 | 7/1999 |
| WO | WO 9932911 | 7/1999 |
| WO | WO 2008/077410 | 7/2008 |
| WO | WO 2009/087348 | 7/2009 |
| WO | WO2010/034986 A1 | 4/2010 |
| WO | WO 2010/055324 | 5/2010 |
| WO | WO 2011/042023 | 4/2011 |

OTHER PUBLICATIONS

International Search Report and Written Opinion, issued Jan. 31, 2012, by the European Patent Office for corresponding PCT patent application No. PCT/GB2011/051834, 15 pages.

International Preliminary Report on Patentability of the International Searching Authority, mailed May 16, 2013, for corresponding International Application No. PCT/GB2011/051834, 11 pages.

Second Office Action and Search Report from the State Intellectual Property Office of the People's Republic of China, for Chinese Patent Application No. 2011800532050, dated Apr. 27, 2015, 10 pages.

Patent Examination Report No. 2 from IP Australia Office, for Australian Patent Application No. 2011325000, dated May 5, 2015, 7 pages.

European Patent Office, Communication of Third-Party Observations for European Application No. EP11770140.9-1758, Jun. 17, 2013, 7 pages.

Gloaguen, et al., "Dalia Flowlines, Risers, and Umbilicals," OTC 18543, Offshore Technology Conference, Houston, Texas, Apr. 30-May 3, 2007, 8 pages.

Technip, Riser Integrity Management, HSE Flexible Pipe Integrity Forum, Nov. 2008, Aberdeen, 20 pages.

Antoine Felix-Henry, "Prevention and Monitoring of Fatigue-Corrosion of Flexible Risers' Steel Reinforcements," *Proceedings of the 26th International Conference on Offshore Mechanics and Arctic Engineering*, Jun. 2007, 7 pages.

Weppenaar et al., "Present and Future Possibilities in Optical Condition Monitoring of Flexible Pipes," *Offshore Technology Conference*, May 2008, 6 pages.

Third Party Observation filed in the European Patent Office for Application No. EP20110770140, dated Oct. 27, 2014, 3 pages.

Libert et al., Undersea Fiber Communication Systems, Chapter 13, "Cable Technology" *Academic Press*, 1st ed., pp. 453-495, Oct. 3, 2002, edited by Jose Chesnoy.

Patent Examination Report No. 3, from IP Australia for Australian Patent Application No. 2011325000, dated Sep. 1, 2015, 5 pages.

Third Office Action from the State Intellectual Property Office of the People's Republic of China for Chinese Patent Application No. 2011800532050, dated Oct. 28, 2015, 12 pages.

* cited by examiner

FLEXIBLE PIPE AND END FITTING WITH INTEGRATED SENSOR

CROSS REFERENCE TO RELATED APPLCIATIONS

This is the U.S. National Stage of International Application No. PCT/GB2011-051834, filed Sep. 28, 2011, which in turn claims the benefit if the United Kingdom Application No. GB1018538.7, filed Nov. 3, 2010.

This invention relates to an apparatus and method for monitoring a predetermined parameter. Particularly, but not exclusively, the invention relates to the monitoring of parameters such as strain, temperature and/or acoustics. The parameters may be monitored in situ in flexible pipes in the oil and gas industry, for example.

Traditionally flexible pipe is utilised to transport production fluids, such as oil and/or gas and/or water, from one location to another. Flexible pipe is particularly useful in connecting a sub-sea location to a sea level location, and can be applicable for shallow water (less than 1000 feet (304.8 meters)), deep water (less than 3300 feet (1005.8 meters)) and ultra deep water (greater than 3300 feet). Flexible pipe is generally formed as an assembly of a pipe body and one or more end fittings. The pipe body is typically formed as a composite of layered materials that form a pressure-containing conduit. The pipe body is generally built up as a composite structure including metallic and polymer layers. The pipe structure is formed to allow large deflections without causing bending stresses that impair the pipe's functionality over its lifetime.

Nonetheless, it will be appreciated that harsh environmental conditions are present at such operating depths under the sea, including not only high pressures and strong tidal movement but also man-made conditions such as collision with passing vehicles and so on.

Recently, thought has turned to the continual monitoring of various parameters of flexible pipes, such as strain, temperature and acoustics, to help detect structural failures in the pipe. Such structural failure could be leakage, wire breakage, over-bending in the pipe (i.e. bending past the maximum allowable amount before which damage will occur), and interaction between the pipe and external environment such as collisions with other objects, for example.

As a method of monitoring strain, temperature and acoustics in flexible pipe, bare fibres and/or fibres in metal tubes (FIMT) within a protective conduit have been incorporated along the length of the pipe structure and connected to an interrogating device external of the pipe. The fibre is used as an optical fibre for transmitting light and is generally made of glass. The fibres may include Bragg Gratings whereby differential diffraction of light passing down the fibre is used to measure the necessary parameter. Output readings can be analysed to determine the conditions of the pipe over a time period and corrective action can be taken accordingly.

Known methods may use the pressure armour and/or tensile armour wires to carry the conduit. A groove is formed into the side edge of the wire form, into which the conduit is laid and bonded into position. When the pipe is subjected to forces, the conduit therefore experiences the same conditions via this bond to the wires. The fibres etched with Bragg gratings, which are bonded to the inside of the conduit, record the movement experienced by the conduit and thus strain monitoring is achieved.

Temperature can be monitored by including a FIMT that is not bonded to the inside of the conduit, and is therefore able to record temperature independently to strain. Fibres can be configured in a similar manner to monitor acoustic conditions.

Assembling the conduits into the wire, and their eventual removal from the wire at the end fitting stage to enable their connection to the interrogating device, are the challenges faced with the known methods. In terms of preparation, the forming of the initial groove in the wire that will carry the conduit is governed by wire hardness; excessively hard or soft wire can make it difficult to create the required groove geometry. In addition, production time is extended since the conduit must be fitted and bonded into the wire's groove prior to applying the armour layer. At pipe completion when the end fitting is assembled, the conduits must be separated from the armour wires to facilitate their connection to an external device. As the conduits are bonded into the wire, removing them from the groove is difficult and can induce unnecessary stress in the material.

It is an aim of the present invention to at least partly mitigate the above-mentioned problems.

It is an aim of embodiments of the present invention to enable a fibre and/or a conduit containing a fibre to be incorporated into a pipe structure relatively easily during manufacture compared to known configurations.

It is an aim of embodiments of the present invention to enable a fibre and/or a conduit containing a fibre to be incorporated into a pipe structure, such that disassembly of the pipe structure when pipe layers are incorporated with an end fitting installation, is relatively easy.

It is an aim of embodiments of the present invention to provide a flexible pipe with fibre optic technology at relatively low cost.

According to a first aspect of the present invention there is provided a method of manufacturing a flexible pipe body, comprising:
 providing a fluid retaining layer;
 wrapping a plurality of tensile armour elements around the fluid retaining layer; and
 wrapping a crush resistant elongate body that houses at least one fibre element around the fluid retaining layer and radially between two of the plurality of tensile armour elements.

According to a second aspect of the present invention there is provided flexible pipe body for transporting fluids from a sub-sea location, comprising:
 a fluid retaining layer;
 a plurality of tensile armour elements provided around the fluid retaining layer; and
 a crush resistant elongate body that houses at least one fibre element provided around the fluid retaining layer and radially between two of the plurality of tensile armour elements.

According to a third aspect of the present invention there is provided a method of manufacturing a flexible pipe, comprising:
 providing a flexible pipe body comprising a crush resistant elongate body housing at least one fibre element for sensing one or more parameter associated with the flexible pipe;
 at least partly filling the elongate body with a flowable, curable matrix material; connecting the flexible pipe body to at least one end fitting so that the elongate body protrudes from the end fitting for connection to a sensing device; and
 curing the matrix material.

According to a fourth aspect of the present invention there is provided flexible pipe for transporting fluids from a sub-sea location, comprising:

a flexible pipe body comprising a crush resistant elongate body, the elongate body housing at least one fibre element for sensing one or more parameter associated with the flexible pipe;

at least one end fitting connected to an end of the flexible pipe body;

wherein the elongate body is at least partly filled with a matrix material, and wherein the elongate body protrudes from the end fitting for connection to a sensing device.

Certain embodiments of the invention provide the advantage that a fibre element for measuring parameters such as strain, temperature and the like can be incorporated into a flexible pipe body cheaply and conveniently, without requiring additional forming steps to prepare a groove for the fibre to be housed in. The arrangement may take advantage of the gaps that occur between wound tensile armour elements to locate a crush resistant elongate body, or create a gap by replacing a tensile armour element with an elongate body.

Certain embodiments of the invention provide the advantage that a parameter such as strain, temperature and the like can be monitored in a flexible pipe continuously or repeatedly, at desired times or when triggered by the occurrence of a predetermined event.

Certain embodiments of the invention provide the advantage that a fibre element (including bare fibre or FIMT) can be locally bonded by curing to restrain the fibre element in place, which can also aid its assembly and removal.

Certain embodiments of the invention provide the advantage that the relatively delicate fibre element can be assembled within a flexible pipe whilst a surrounding matrix material is flowable, thereby protecting the fibre element, and then later allow the matrix material to be cured and set to restrain the fibre element in place.

Embodiments of the invention are further described hereinafter with reference to the accompanying drawings, in which.

In the drawings like reference numerals refer to like parts.

Figure 1:
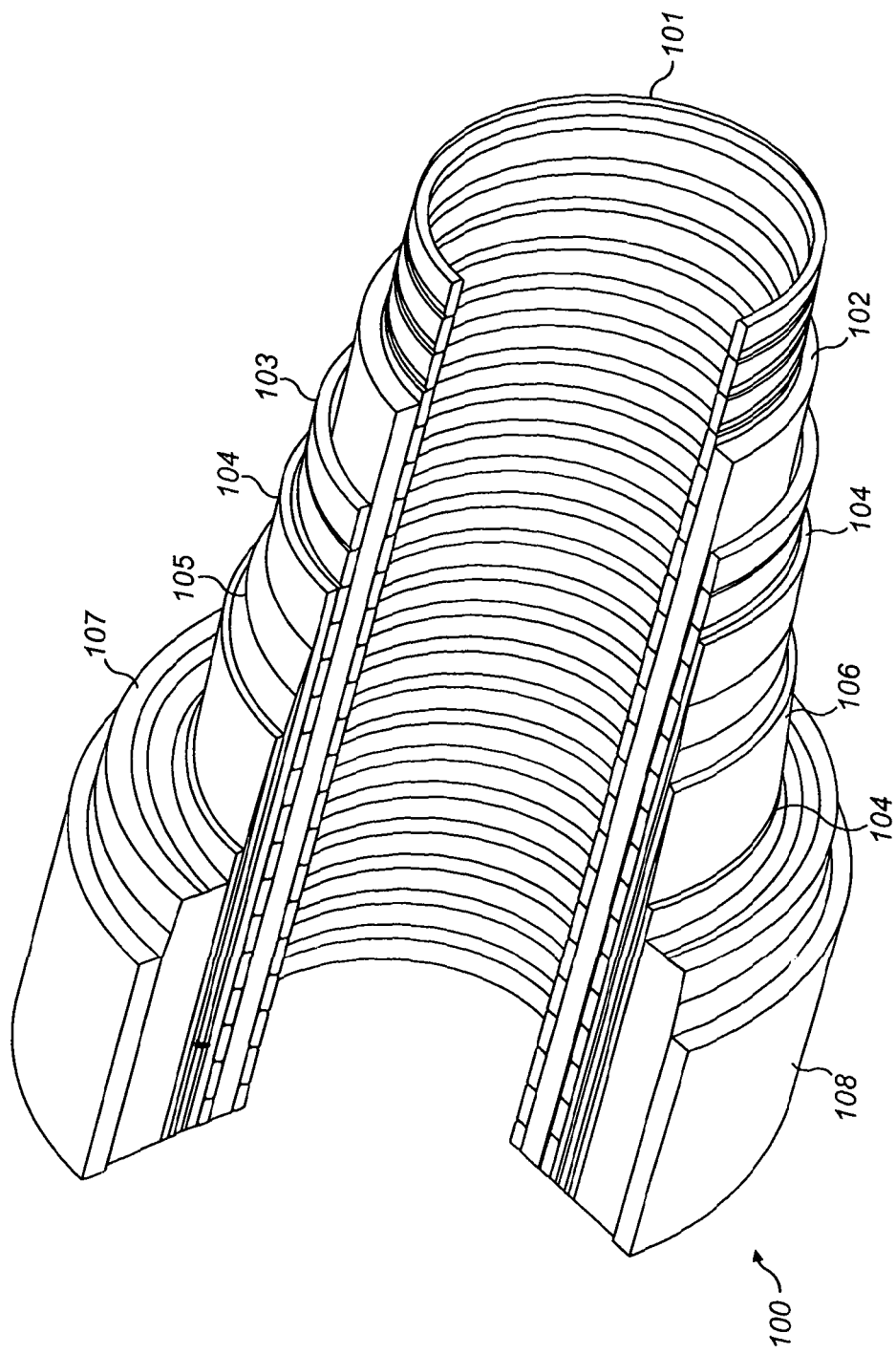
FIG. 1 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 may be formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers manufactured from a variety of possible materials. It is to be further noted that the layer thicknesses are shown for illustrative purposes only.

As illustrated in FIG. 1, an example of a pipe body includes an innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' as well as such 'rough bore' applications.

The internal pressure sheath 102 acts as a fluid retaining layer and comprises a polymer layer that ensures internal fluid integrity. It is to be understood that this layer may itself comprise a number of sub-layers. It will be appreciated that when the carcass layer is utilised the internal pressure sheath is often referred to by those skilled in the art as a barrier layer. In operation without such a carcass (so-called smooth bore operation) the internal pressure sheath may be referred to as a liner.

A pressure armour layer 103 is a structural layer with a lay angle close to 90° that increases the resistance of the flexible pipe to internal and external pressure and mechanical crushing loads. The layer also structurally supports the internal pressure sheath.

The flexible pipe body also includes a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body shown also includes layers 104 of tape which help contain underlying layers and to some extent prevent abrasion between adjacent layers.

The flexible pipe body also typically includes layers of insulation 107 and an outer sheath 108 which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
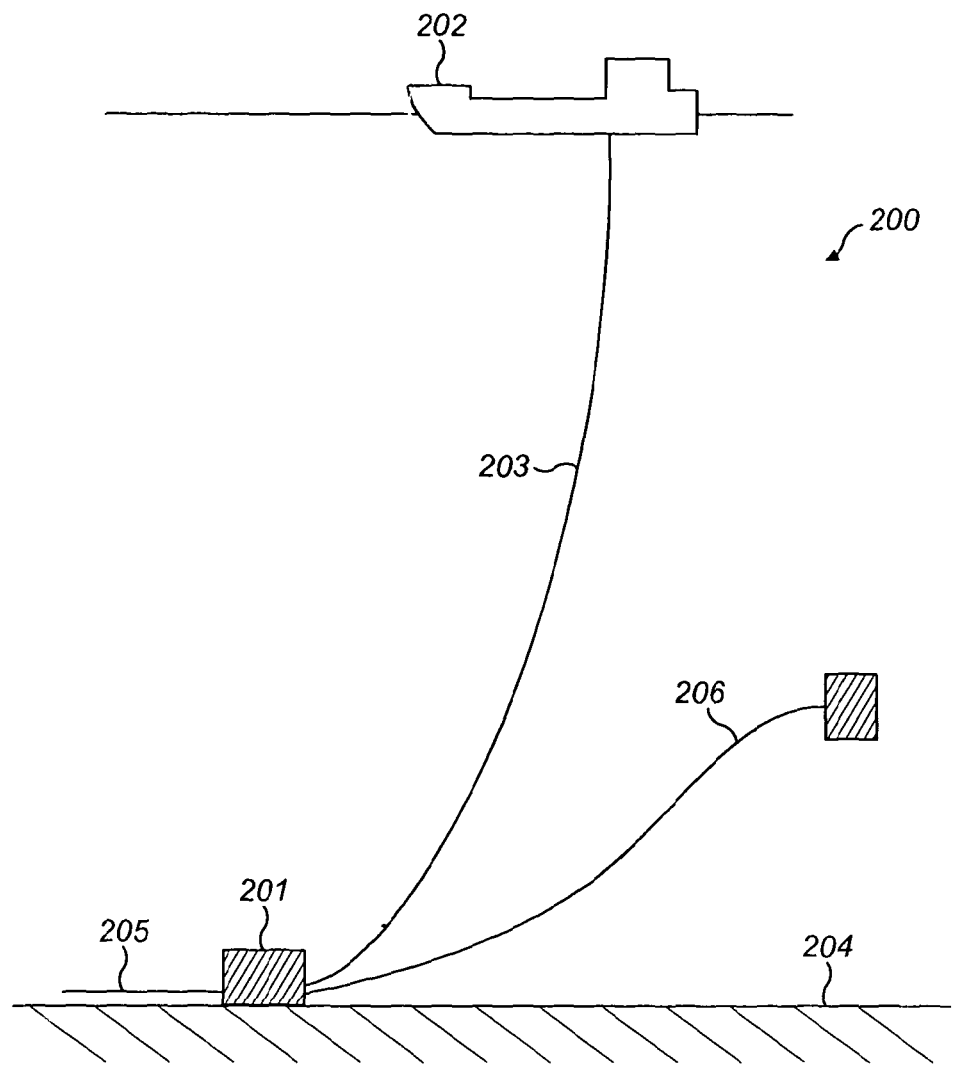
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe body can be utilised as a flow line 205 or jumper 206.

As mentioned above, a portion of a pipe body is terminated in an end fitting. The end fittings of a flexible pipe may be used for connecting segments of flexible pipe together or for connecting them to terminal equipment such as a rigid sub-sea structures or floating facilities. The termination may include securing each layer of the flexible pipe body to the end fitting, as generally described in WO2007/144552, for example.

Figure 3A:
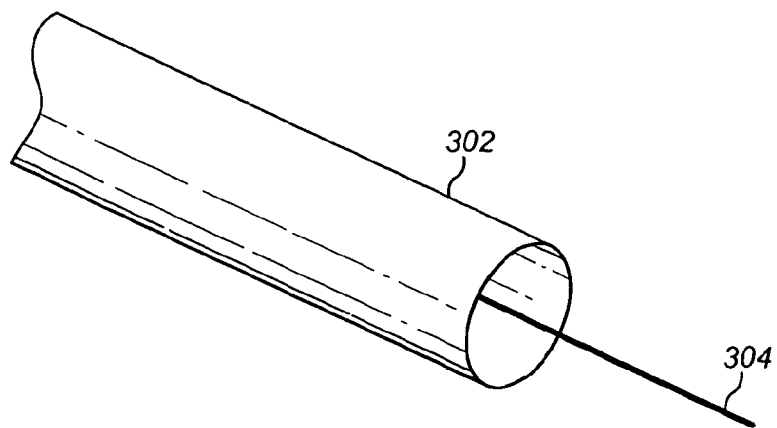
FIGS. 3a, 3b and 3c illustrate various fibre elements.
Figure 3B:
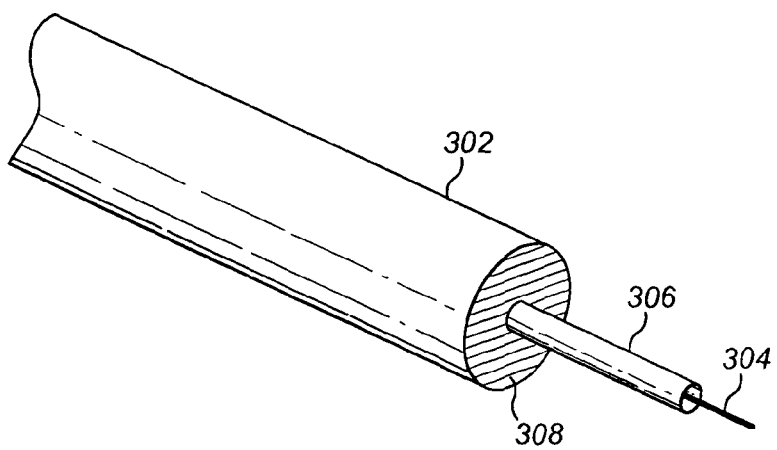
Figure 3C:
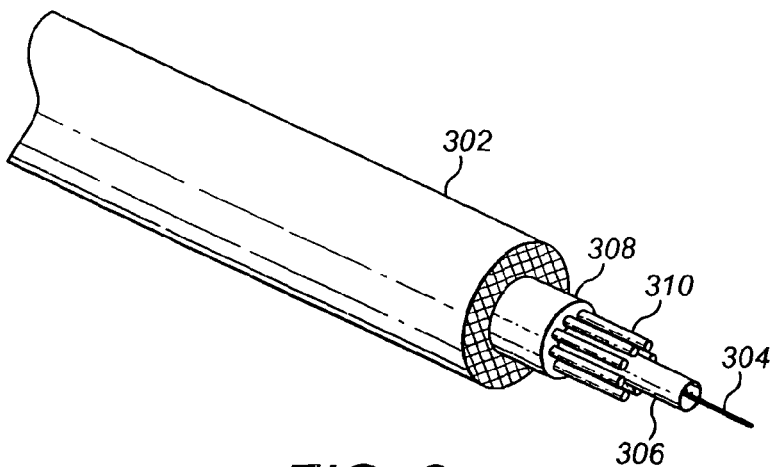

FIGS. 3a, 3b and 3c show various examples of a crush resistant conduit (elongate body) 302 of the present invention.

The conduit may be formed from metal. The conduit houses a fibre element, which may be of glass, for use in fibre optic sensing methods, and which could be provided in various forms. The conduit is a hollow protective tube and may have a substantially circular, rectangular, square or oval cross section for example.

In FIG. 3a, the conduit 302 contains a bare fibre 304. As shown in FIG. 3b, the conduit contains a fibre in metal tube (FIMT) including an optical fibre 304 and a metal tube 306. In addition, the conduit 302 is substantially filled with a matrix material such as heat curable epoxy resin so as to better retain the FIMT in position within the conduit. As shown in FIG. 3c, in addition to a FIMT, the conduit 302 also contains further bare fibres 310 that run along the length of the conduit and are bonded within the matrix material directly. Such bare fibres encapsulated by the resin can be used as part of fibre optic sensor apparatus to measure strain. This is because, when a fibre is locked within the conduit and the conduit is under strain, the loads are transferred directly to the fibre. The fibre can be etched with Fibre Bragg Gratings (FBGs) or can be a Distributed Temperature Sensing (DTS) System, as is known in the art. On the other hand a fibre that is not directly encapsulated by resin, such as that shown in FIG. 3a, or the FIMT 304, 306 shown in FIG. 3b, does not experience the strain from its surroundings. Therefore, a true temperature reading can be measured. Again, FBGs or DTS can be used.

In accordance with an embodiment of the present invention, the fibre element(s), in any of the above-mentioned arrangements, may be incorporated into a flexible pipe for the monitoring of strain, temperature, acoustics and the like. By monitoring these parameters, the results can be used to check heat build up in the metallic layers, temperature change (that may be due to a flooded annulus), strain due to armour curvature, overall strain within the pipe, etc. The fatigue life profile and polymer temperature profile of a riser during service can be determined. In addition, the results can determine whether a pipe has been over-bent or overheated during its service life.

In an embodiment of the present invention, a conduit is wrapped around a previously formed layer (such as the fluid retaining layer, pressure armour layer or another tensile armour layer), alongside other wires of a tensile armour layer. The conduit is located radially between two tensile armour wires. Because the conduit 302 is crush resistant, the conduit can effectively act as another tensile armour wire, whilst also housing the necessary fibre for performing monitoring of parameters of the pipe. To ensure the crush resistance of the conduit 302, it is possible to calculate the stiffness coefficient in at least one dimension of the conduit and/or matrix material. This is determined based on its dimensions, the cross-sectional shape of the conduit, and the materials it is formed from, and can be calculated by a person skilled in the art according to the specific requirements of the particular application. The conduit can therefore be pre-fabricated so that its mechanical properties, when/if cured, are similar to a tensile armour wire.

Figure 4A:
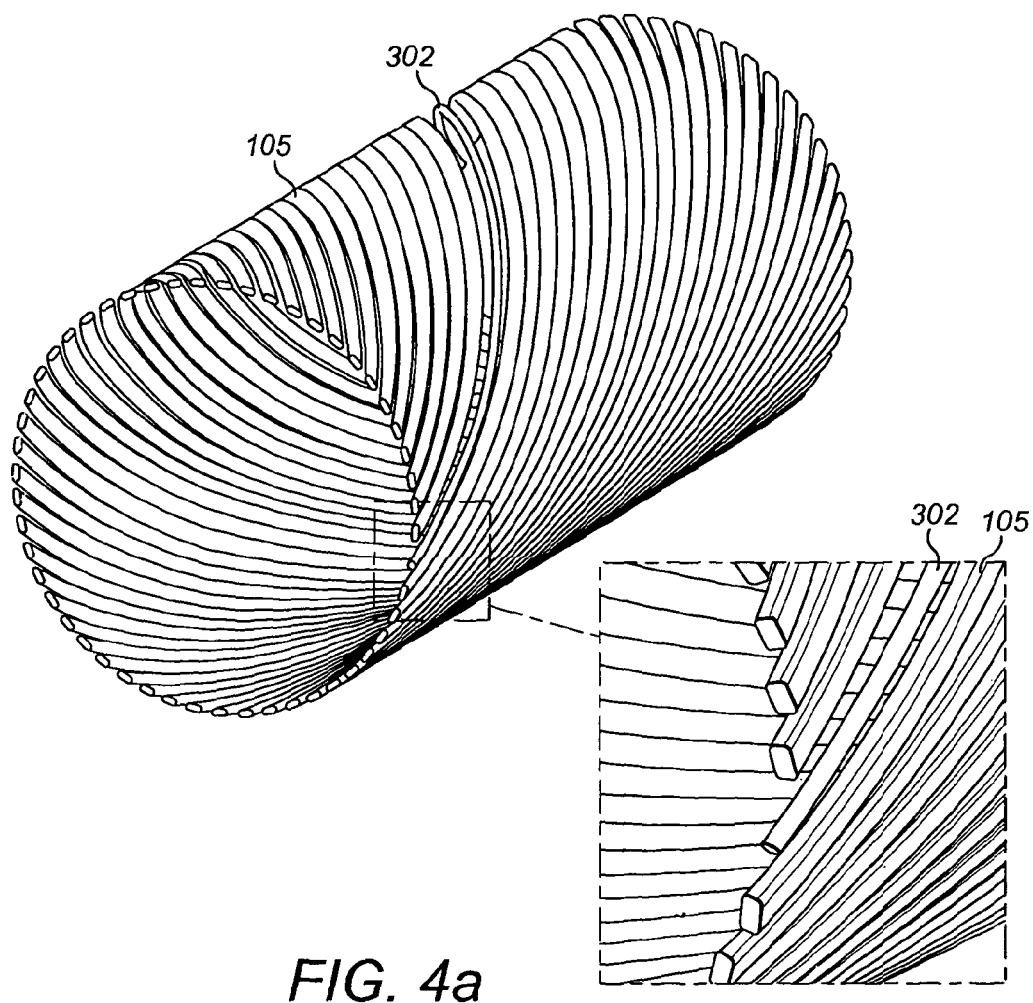
FIGS. 4a and 4b illustrate fibre-containing conduits in position in a tensile armour layer.

In FIG. 4a, a tensile armour layer is shown. A fibre-containing conduit 302 is wrapped alongside tensile armour wires, in the same manner as the tensile armour wires, effectively as a replacement for one of the tensile armour wires. The conduit is therefore located radially between two tensile armour wires. The remaining layers of the flexible pipe body are not shown.

Figure 4B:
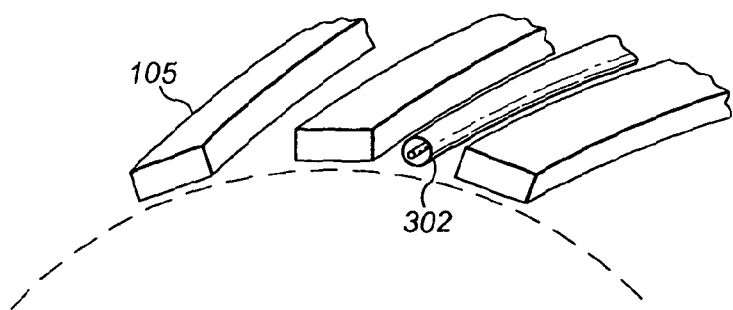

Alternatively, as shown in FIG. 4b, a fibre-containing conduit 302 can be positioned in one of the gaps that will be present between tensile armour wires when there is a less than 100% fraction fill (i.e. when the tensile armour wires are not wound so as to be touching).

Thus, rather than replacing a tensile wire, the conduit is additional to all tensile wires. Ideally, the conduit should be resistant to crushing, at least as strong as a tensile armour wire, and should also resistant to deformation or crushing by the surrounding armour wires.

As the conduit is essentially an additional component of the tensile armour layer, rather than an integral part of a tensile wire, it can be applied at the same time as the armour wires. Wire preparation prior to manufacturing the pipe body is not required. The method of laying the conduit with the armour wires will somewhat depend upon the geometry of the conduit. For example, if the conduit has a round cross section, it can be laid during the application of tensile armour wires using an additional planetary bobbin attachment to a standard flat wire machine. If the cross section of the conduit is square, it can be laid using the same laying technique as the tensile wire, because this will not induce a twist in the conduit.

Upon formation of a pipe body, layers are generally sequentially terminated in an end fitting. The fibre-containing conduit 302 is therefore dealt with similarly to its surrounding armour wires, although it should be protruded from the end fitting so as to enable connection to an interrogation device (sensor monitoring unit).

Figure 5:
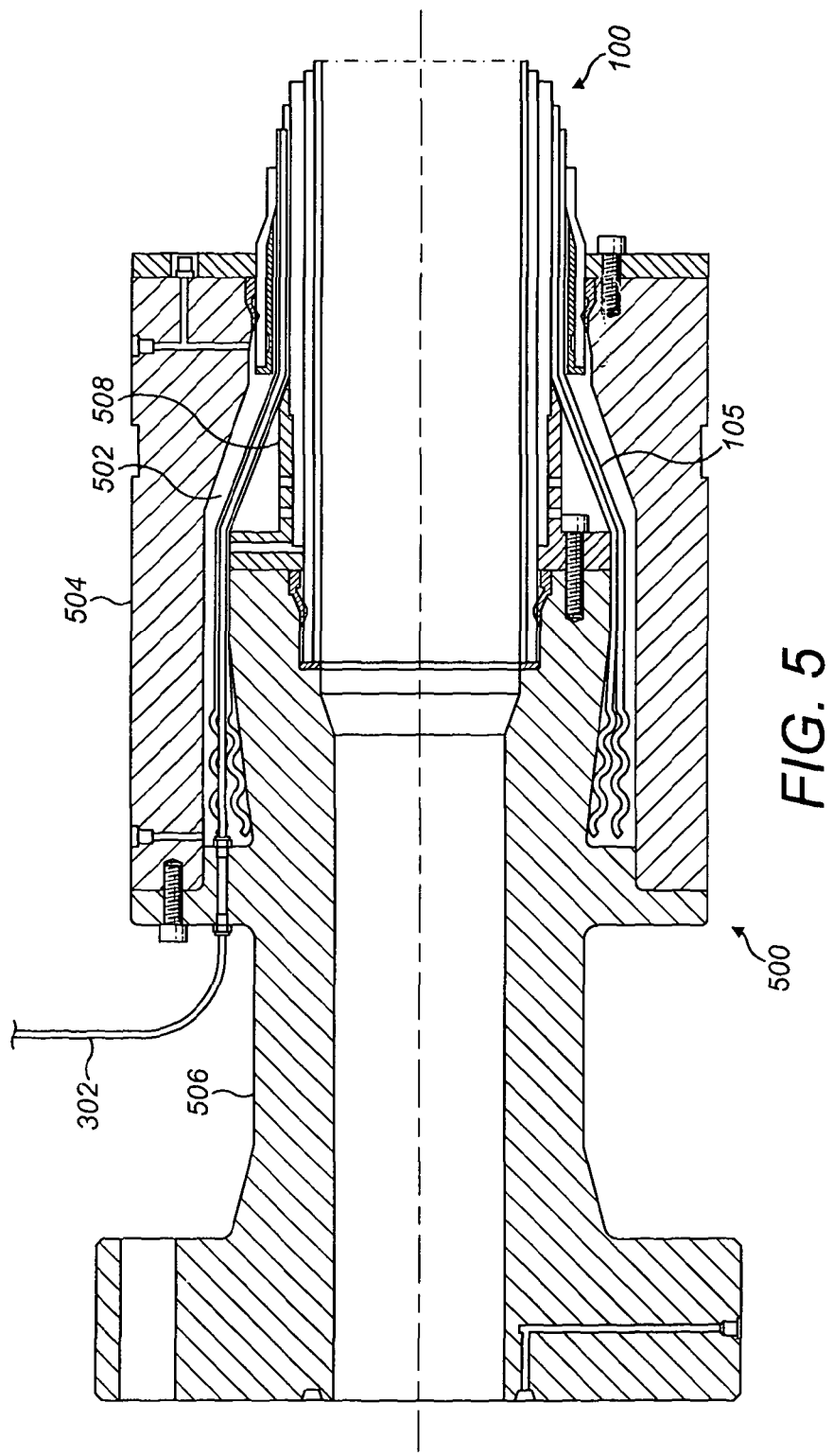
FIG. 5 illustrates a pipe body terminated in an end fitting.

FIG. 5 shows a pipe body 100 terminated in an end fitting 500. The tensile armour wires 105 are gently peeled away from their natural pathway and terminated in a cavity 502 formed between an inner surface of a housing 504 of the end fitting and the end fitting body 506 and a collar member 508. The conduit 302 is inserted through a hole in the end fitting body 506 so that it can be connected to an interrogation device (not shown). The hole may be a standard port fitted with olives to lock the conduit at the end fitting (to prevent slipping) and to prevent seawater entry to the internal elements. The interrogation device could be located at the sea surface to allow access to the device. The cavity 502 can be filled with epoxy resin to retain the armour wires in position.

During installation of the conduit through the end fitting, it is useful for the conduit to be handled as a separate element to the armour wires. Handling is therefore easier than known methods where sensing elements are joined to armour wire.

Easier installation is further achieved when the epoxy resin that fills a conduit is not already cured whilst the conduit is being handled and fed through the end fitting. It is therefore useful to cure and set the epoxy resin after installation though the end fitting. Alternatively, a conduit may be cured in only designated areas where heat has been applied. With this method, manufacturing can be completed as normal, a pipe can be shipped to its designated location with the epoxy in an uncured state, and then cured offshore.

The optical fibre may be looped or spliced to provide a return up the same conduit. A laser can send light pulses down the optical fibre and a detector can measure the reflections from each light pulse. The interrogation device can then analyse these results to determine strain or temperature, for example.

The finished pipe assembly can then be used for fluid transport, whilst being continually or periodically monitored for strain, temperature, etc. Readings could be linked to an alarm system to notify users in the event of an adverse reading outside predetermined acceptable limits.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing a flexible pipe body, comprising:
    providing a fluid retaining layer;
    wrapping a plurality of tensile armour elements around the fluid retaining layer to form a tensile armour layer; and
    wrapping a crush resistant elongate body that houses at least one fibre in a metal tube (FIMT) around the fluid retaining layer and alongside two of the plurality of tensile armour elements in the tensile armour layer to be radially between two of the plurality of tensile armour elements, and
    wherein the crush resistant elongate body is substantially filled with a matrix material.

2. A method as claimed in claim 1, further comprising winding a pressure armour layer around the fluid retaining layer prior to the steps of wrapping the tensile armour elements and elongate body.

3. A method as claimed in claim 1 wherein the tensile armour elements are wire tendons.

4. A method as claimed in claim 1 wherein a fibre of the at least one FIMT is configured to be connectable to a sensing device for monitoring of one or more parameters associated with the flexible pipe.

5. A method as claimed in claim 4, wherein the at least one FIMT is configured to monitor at least one of temperature and strain.

6. A method as claimed in claim 1, wherein a fibre of the at least one FIMT is etched with Bragg gratings, and/or is at least partly bonded to the elongate conduit at a predetermined location.

7. A method as claimed in claim 1, wherein the plurality of tensile armour elements and the elongate body are wrapped around the fluid retaining layer concurrently.

8. A method as claimed in claim 1 wherein the elongate element is formed to substantially the same dimensions as a tensile armour element.

9. A method as claimed in claim 8 further comprising wrapping a layer of further tensile armour elements over the plurality of tensile armour elements.

10. Flexible pipe body for transporting fluids from a sub-sea location, comprising:
    a fluid retaining layer;
    a plurality of tensile armour elements provided around the fluid retaining layer to form a tensile armour layer; and
    a crush resistant elongate body that houses at least one fibre in a metal tube (FIMT) provided around the fluid retaining layer and alongside two of the plurality of tensile armour elements in the tensile armour layer to be radially between two of the plurality of tensile armour elements, and
    wherein the crush resistant elongate body is substantially filled with a matrix material.

11. Flexible pipe body as claimed in claim 9, further comprising a pressure armour layer between the fluid retaining layer and the tensile armour elements.

12. Flexible pipe body as claimed in claim 10 wherein the tensile armour elements are wire tendons.

13. Flexible pipe body as claimed in claim 10 wherein the at least one FIMT is configured to be connectable to a sensing device for monitoring of one or more parameters associated with the flexible pipe.

14. Flexible pipe body as claimed in claim 13, wherein the at least one FIMT is configured to monitor at least one of temperature and strain.

15. Flexible pipe body as claimed in claim 10, wherein a fibre of the at least one FIMT is etched with Bragg gratings, and/or is at least partly bonded to the elongate conduit at a predetermined location.

16. Flexible pipe body as claimed in claim 10 wherein the elongate element has substantially the same dimensions as a tensile armour element.

17. Flexible pipe body as claimed in claim 16 further comprising a layer of further tensile armour elements over the plurality of tensile armour elements.

18. A method of manufacturing a flexible pipe, comprising:
    providing a flexible pipe body, wherein the flexible pipe body comprises a fluid retaining layer, a plurality of tensile armour elements provided around the fluid retaining layer, and a crush resistant elongate body provided around the fluid retaining layer and radially between two of the plurality of tensile armour elements, the crush resistant elongate body housing at least one fibre element for sensing one or more parameter associated with the flexible pipe;
    at least partly filling the elongate body with a flowable, curable matrix material;
    connecting the flexible pipe body to at least one end fitting so that the elongate body protrudes from the end fitting for connection to a sensing device; and
    curing the matrix material.

19. A method as claimed in claim 18, wherein the matrix material is an epoxy resin.

20. A method as claimed in claim 18, wherein the curing step comprises exposing the matrix material to heat.

21. A method as claimed in claim 18, wherein the method further comprises adding a further quantity of matrix material to the end fitting for restraining ends of the plurality of tensile armour elements, and curing the further quantity of matrix material concurrently with the matrix material.

22. Flexible pipe for transporting fluids from a sub-sea location, comprising:
    a flexible pipe body comprising a fluid retaining layer, a plurality of tensile armour elements provided around the fluid retaining layer, and a crush resistant elongate body provided around the fluid retaining layer and radially between two of the plurality of tensile armour elements, the crush resistant elongate body housing at least one fibre element for sensing one or more parameter associated with the flexible pipe;

at least one end fitting connected to an end of the flexible pipe body;

wherein the elongate body is at least partly filled with a matrix material, and wherein the elongate body protrudes from the end fitting for connection to a sensing device.

23. Flexible pipe as claimed in claim 22, wherein the matrix material is an epoxy resin.

24. Flexible pipe as claimed in claim 22, wherein the matrix material has been cured by heat.

25. Flexible pipe as claimed in claim 22, wherein the end fitting comprises a further matrix material for restraining ends of the plurality of tensile armour elements.

* * * * *